US009563449B2

(12) United States Patent
Burckart et al.

(10) Patent No.: US 9,563,449 B2
(45) Date of Patent: *Feb. 7, 2017

(54) MOBILIZING A WEB APPLICATION TO TAKE ADVANTAGE OF A NATIVE DEVICE CAPABILITY

(71) Applicant: International Business Machines Corporation, Armonk, NY (US)

(72) Inventors: Erik J. Burckart, Raleigh, NC (US); Dinakaran Joseph, Apex, NC (US); Todd E. Kaplinger, Raleigh, NC (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/079,031

(22) Filed: Nov. 13, 2013

(65) Prior Publication Data

US 2014/0281905 A1 Sep. 18, 2014

Related U.S. Application Data

(63) Continuation of application No. 13/801,848, filed on Mar. 13, 2013.

(51) Int. Cl.
*G06F 17/00* (2006.01)
*G06F 9/445* (2006.01)
*G06F 9/455* (2006.01)
*G06F 17/30* (2006.01)

(52) U.S. Cl.
CPC ....... *G06F 9/44526* (2013.01); *G06F 9/45529* (2013.01); *G06F 17/30893* (2013.01)

(58) Field of Classification Search
CPC .. G06F 17/24; G06F 9/45529; G06F 9/44526; G06F 17/30899
See application file for complete search history.

(56) References Cited

U.S. PATENT DOCUMENTS

| 6,980,175 | B1 | 12/2005 | Narayanaswami |
| 7,343,559 | B1 | 3/2008 | Fujita et al. |
| 7,386,786 | B2 * | 6/2008 | Davis et al. ................. 715/234 |

(Continued)

FOREIGN PATENT DOCUMENTS

| CN | 101980152 A | 2/2011 |
| CN | 102647716 A | 8/2012 |
| CN | 102999624 A | 3/2013 |

OTHER PUBLICATIONS

"Personalization Toolkit Workflow & Authorization Management", GXD00019_en, version 1.10, GX WebManager 9.11.0 and higher, Jan. 11, 2010, pp. 1-41.

(Continued)

*Primary Examiner* — Mustafa Amin
(74) *Attorney, Agent, or Firm* — Scully, Scott, Murphy & Presser, P.C.; Stephen R. Yoder

(57) ABSTRACT

Mechanisms are provided to mobilize a web application (e.g., a webpage) to take advantage of a native device capability (e.g., a native device capability of a mobile device). In one example, existing program code in a webpage that performs a first action that uses functionality of desktop software is identified and replaced with replacement program code that performs a second action that uses native device capability of a mobile device.

11 Claims, 5 Drawing Sheets

(56) References Cited

U.S. PATENT DOCUMENTS

| | | | |
|---|---|---|---|
| 7,788,577 B2* | 8/2010 | Lueck | 715/239 |
| 7,911,409 B1 | 3/2011 | Chatterjee et al. | |
| 8,073,895 B2 | 12/2011 | Hamzeh et al. | |
| 8,627,216 B2* | 1/2014 | Brichford et al. | 715/760 |
| 8,694,925 B1* | 4/2014 | Beust et al. | 715/866 |
| 9,244,606 B2 | 1/2016 | Kocienda et al. | |
| 2002/0054126 A1* | 5/2002 | Gamon | 345/781 |
| 2003/0030839 A1* | 2/2003 | Walters | H04N 1/00127 358/1.15 |
| 2004/0148571 A1* | 7/2004 | Lue | 715/514 |
| 2004/0172637 A1* | 9/2004 | Koutyrine | G06F 8/52 719/328 |
| 2004/0209607 A1 | 10/2004 | Stepanich et al. | |
| 2005/0091576 A1* | 4/2005 | Relyea | G06F 9/4443 715/211 |
| 2006/0062362 A1* | 3/2006 | Davis | 379/100.13 |
| 2006/0085741 A1 | 4/2006 | Weiner et al. | |
| 2006/0168285 A1* | 7/2006 | Nielsen | G06F 17/3089 709/231 |
| 2006/0288280 A1* | 12/2006 | Makela | 715/530 |
| 2007/0130525 A1* | 6/2007 | Murphy et al. | 715/747 |
| 2007/0220507 A1 | 9/2007 | Back et al. | |
| 2007/0239726 A1* | 10/2007 | Weiss et al. | 707/10 |
| 2008/0072139 A1* | 3/2008 | Salinas et al. | 715/238 |
| 2009/0125533 A1* | 5/2009 | Calbucci | 707/100 |
| 2009/0132572 A1 | 5/2009 | Massie et al. | |
| 2009/0204481 A1* | 8/2009 | Navar et al. | 705/10 |
| 2009/0327399 A1* | 12/2009 | Dorbes et al. | 709/202 |
| 2010/0064209 A1* | 3/2010 | Wielgosz et al. | 715/236 |
| 2010/0145946 A1* | 6/2010 | Conrad et al. | 707/736 |
| 2010/0169761 A1* | 7/2010 | Lee et al. | 715/234 |
| 2010/0174974 A1 | 7/2010 | Brisebois et al. | |
| 2010/0199197 A1 | 8/2010 | Faletski et al. | |
| 2011/0287750 A1* | 11/2011 | Watanabe et al. | 455/414.3 |
| 2012/0060087 A1 | 3/2012 | Jame et al. | |
| 2012/0102429 A1 | 4/2012 | Naderi et al. | |
| 2012/0131446 A1* | 5/2012 | Park | 715/238 |
| 2012/0159380 A1 | 6/2012 | Kocienda et al. | |
| 2012/0220263 A1* | 8/2012 | Smith | H04W 4/003 455/410 |
| 2013/0013921 A1 | 1/2013 | Bhathena et al. | |
| 2013/0086639 A1* | 4/2013 | Sondhi et al. | 726/4 |
| 2013/0091439 A1 | 4/2013 | Sirpal et al. | |
| 2013/0174015 A1* | 7/2013 | Jeff | 715/234 |
| 2013/0227078 A1* | 8/2013 | Wei et al. | 709/219 |
| 2013/0302005 A1* | 11/2013 | Harwell | H04N 21/2408 386/200 |

OTHER PUBLICATIONS

Rykowski, J. et al., "Personalization of Information Delivery by the Use of Agent", 2003, pp. 1056-1059.
Sarah Allen et al., PhoneGap, Pro Smartphone Cross-Platform Development, 2010, Part 2, pp. 131-152, DOI: 10.1007/978-1-4302-2869-1_8.
U.S. Office Action dated Apr. 3, 2015 issued in U.S. Appl. No. 13/801,820.
U.S. Office Action dated Apr. 3, 2015 issued in U.S. Appl. No. 14/079,209.
U.S. Office Action dated Aug. 27, 2015 issued in U.S. Appl. No. 14/079,100.
U.S. Office Action dated Sep. 2, 2015 issued in U.S. Appl. No. 14/079,209.
U.S. Office Action dated Aug. 27, 2015 issued in U.S. Appl. No. 13/801,820.
Myer, T., "Beginning PhoneGap", John Wiley & Sons, Inc, (Dec. 2011), 9 pages.
U.S. Office Action dated Oct. 1, 2015 issued in U.S. Appl. No. 13/801,830.
U.S. Office Action dated Oct. 6, 2015 issued in U.S. Appl. No. 14/070,019.
U.S. Office Action dated Oct. 1, 2015 issued in U.S. Appl. No. 13/801,892.
U.S. Office Action dated Jul. 2, 2015 issued in U.S. Appl. No. 13/801,848.
Yu Ping et al., Transforming legacy web applications to the MVC architecture , Proceedings of the eleventh annual international workshop on Software Technology and Engineering Practice (STEP 2004), Dec. 2004, DOI: 10.1109/STEP.2003.35, Date of Conference: Sep. 19-21, 2003, 10 pages.
http://docs.phonegap.com/en/2.3.0/index.html, "Apache Cordova API Documentation" printed Feb. 12, 2013 1 page.
http://alebelcor.blogspot.com/2011/10/htm15-apis.html, "HTML5 APIs" printed Feb. 12, 2013 4 pages.
http://en.wikipedia.org/wiki/PhoneGap, "PhoneGap" printed Feb. 7, 2013 5 pages.
http://www.htmltemplates.net/, "Html Templates", printed Feb. 4, 2013 2 pages.
Camden, R., "Converting a dynamic web site to a PhoneGap application", http://www.raymondcamden.com/2012/05/05/converting-a-dynamic-web-site-to-a-phonegap-application, (May 5, 2012), Retrieved on Aug. 19, 2015, pp. 1-13.
Lees, A., "Launch a website as a mobile app using PhoneGap/Apache Cordova", http://antonylees.blogspot.com/2013/02/launch-website-as-mobile-app-using.html, (Feb. 27, 2013), Retrieved on Aug. 19, 2015, pp. 1-8.
Andreucci, G., "Pro iOS Geo: Building Apps with Location Based Services", publication date: Jan. 30, 2013, pp. 1-9, URL:<http://techbus.safaribooksonline.com/book/programming/mobile/9781430247043/chapter-7-creating-hybrid-app>.
Myer, T., "Beginning PhoneGab", John Wiley & Sons, Inc., 2012, total pp. 388.
Office Action dated Apr. 22, 2016, received in U.S. Appl. No. 13/801,892, 32 pages.
Office Action dated May 5, 2016, received in U.S. Appl. No. 13/801,830, 28 pages.
Office Action dated May 6, 2016, received in U.S. Appl. No. 14/070,019, 25 pages.
Office Action dated Jun. 17, 2016, received in parent U.S. Appl. No. 13/801,848, 16 pages.
Office Action dated Dec. 30, 2015 received in U.S. Patent Application, namely U.S. Appl. No. 14/079,209, pp. 1-33.
Office Action dated Dec. 31, 2015 received in U.S. Patent Application, namely U.S. Appl. No. 13/801,820, pp. 1-35.

* cited by examiner

MOBILIZING A WEB APPLICATION TO TAKE ADVANTAGE OF A NATIVE DEVICE CAPABILITY

CROSS-REFERENCE TO RELATED APPLICATIONS

This application is a continuation of U.S. Ser. No. 13/801,848, filed Mar. 13, 2013, which is related to commonly-owned, co-pending U.S. patent application Ser. No. 13/801,924 entitled, "TRANSFORMING APPLICATION CACHED TEMPLATE USING PERSONALIZED CONTENT", filed on Mar. 13, 2013; U.S. patent application Ser. No. 13/801,820 entitled, "MOBILE ENABLEMENT OF WEBPAGES", filed on Mar. 13, 2013; U.S. patent application Ser. No. 13/801,830 entitled, "MOBILE ENABLEMENT OF EXISTING WEB SITES", filed on Mar. 13, 2013; and U.S. patent application Ser. No. 13/801,892 entitled, "ENHANCED MOBILIZATION OF EXISTING WEB SITES", filed on Mar. 13, 2013, the entire contents and disclosures of which are expressly incorporated by reference herein as if fully set forth herein.

BACKGROUND

The present disclosure relates generally to the field of mobilizing a web application (e.g., a webpage) to take advantage of a native device capability (e.g., a native device capability of a mobile device). In one example, the mobilizing may be implemented by modifying an existing web application (e.g., an existing webpage).

SUMMARY

In one example, the present disclosure relates to the field of mobilizing a web application (e.g., a webpage) to take advantage of a native device capability.

In one specific example, the mobilizing may be implemented by modifying the web application (e.g., the webpage).

In another specific example, the web application (e.g., webpage) may be an existing web application (e.g., webpage).

In another specific example, the native device capability may be a native device capability of a mobile device.

In one embodiment, a method for modifying at least one webpage is provided, the method comprising: receiving the webpage; identifying, by a processor, existing program code in the webpage that performs a first action that uses functionality of desktop software; and replacing, by the processor, the identified existing program code with replacement program code that performs a second action that uses native device capability of a mobile device.

In another embodiment, a computer readable storage medium, tangibly embodying a program of instructions executable by the computer for modifying at least one webpage is provided, the program of instructions, when executing, performing the following steps: receiving, by the computer, the webpage; identifying, by the computer, existing program code in the webpage that performs a first action that uses functionality of desktop software; and replacing, by the computer, the identified existing program code with replacement program code that performs a second action that uses native device capability of a mobile device.

In another embodiment, a computer-implemented system for modifying at least one webpage is provided, the system comprising: an input element configured to receive the webpage; an identifying element in operative communication with the input element configured to identify existing program code in the webpage that performs a first action that uses functionality of desktop software; and a replacing element in operative communication with the input element and the identifying element configured to replace the identified existing program code with replacement program code that performs a second action that uses native device capability of a mobile device.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may provide for automatically mobilizing a web application (e.g., a webpage) to take advantage of a native device capability (e.g., a native device capability of a mobile device). In another example, one or more methods may provide for automatically mobilizing a web application (e.g., a webpage) to take advantage of a native device capability (e.g., a native device capability of a mobile device). In another example, one or more algorithms may provide for automatically mobilizing a web application (e.g., a webpage) to take advantage of a native device capability (e.g., a native device capability of a mobile device).

For the purposes of describing and claiming the present invention the term "mobile device" is intended to refer to a device that can communicate data (e.g., receive, transmit) over a network and can be carried by a user. Examples include (but are not limited to): a mobile phone, a cellular phone, a smart phone, and/or a tablet.

For the purposes of describing and claiming the present invention the term "hybrid application" is intended to refer to an application that can be installed natively on a mobile device but that can also have web content such as HTML, CSS and/or JavaScript.

For the purposes of describing and claiming the present invention the term "installed natively on a mobile device" is intended to refer to using the standard native deployment model to distribute the application to end users. The APPLE™ APP STORE and GOOGLE™ PLAY are two examples). Another example is an enterprise app store where corporations can distribute applications to their employees. The key part is having an application physically installed on the device and running locally versus remotely loading an app via a mobile device web browser.

For the purposes of describing and claiming the present invention the term "uses native device capability" is intended to refer to direct or indirect access to the native operating system APIs.

For the purposes of describing and claiming the present invention the term "program code" is intended to refer to computer code instructions.

For the purposes of describing and claiming the present invention the term "widget" is intended to refer to stand-alone piece of program code that is readily insertable into a larger application.

For the purposes of describing and claiming the present invention the term "desktop software" is intended to refer to a software application configured to run on a non-mobile device.

For the purposes of describing and claiming the present invention the term "web application" is intended to refer to a computer application run over the world wide web, using a browser as an interface.

For the purposes of describing and claiming the present invention the term "webpage" is intended to refer to the content shown in a user interface screen displayed by a web browser.

Figure 1:
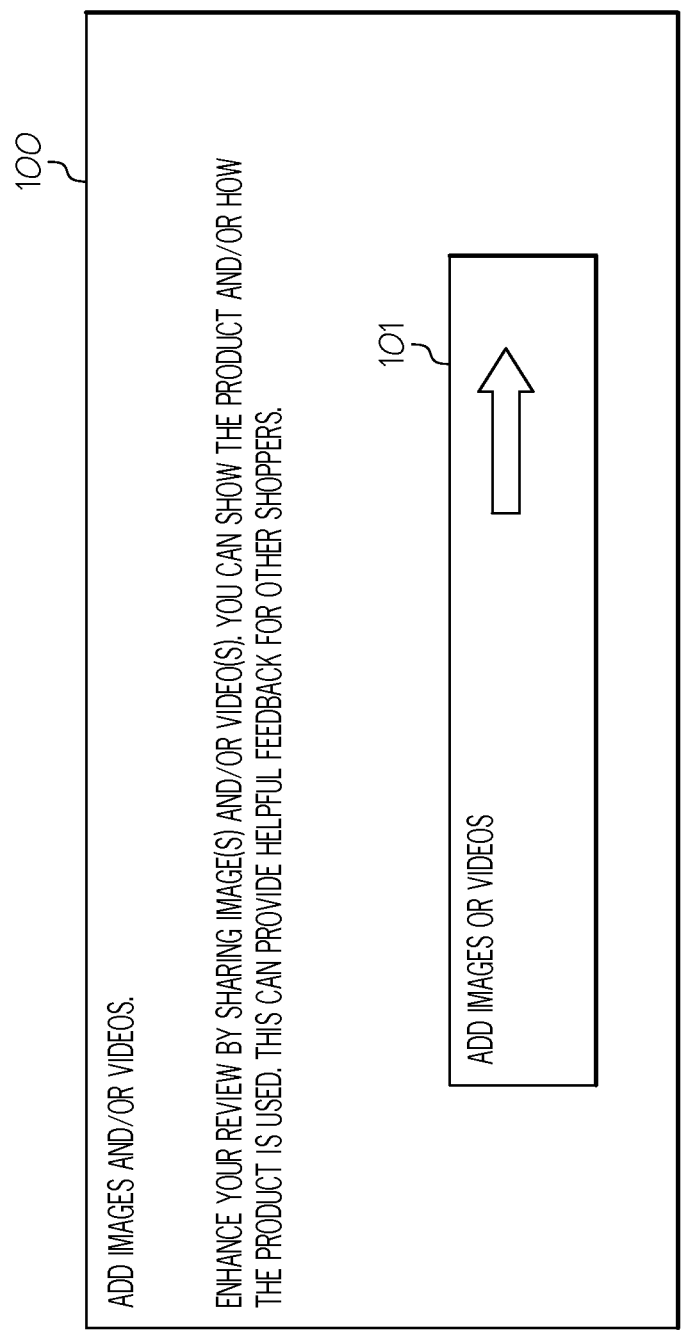
FIG. 1 depicts a form that represents a typical product rating form that is part of a webpage.
Figure 2:
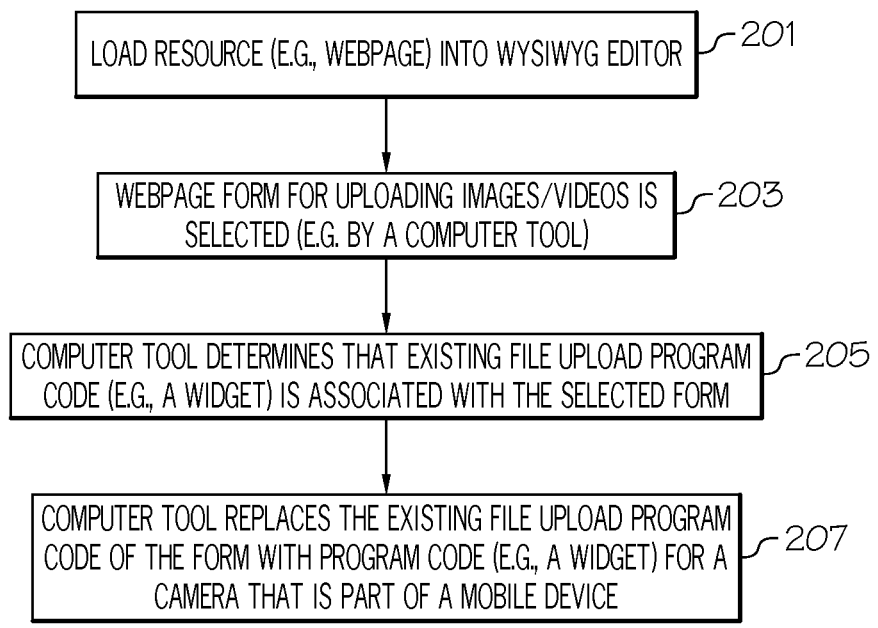
FIG. 2 depicts a flowchart that shows details of an example workflow for carrying out an implementation according to an embodiment of the present invention.

Referring now to FIGS. 1 and 2, an example implementation according to one embodiment is shown. For the purposes of this example, form 100 of FIG. 1 represents a product rating form (or widget) that is part of a webpage of a conventional e-commerce website (other examples may be applied to social networking (e.g., social networking websites) and/or websites such as CRAIGSLIST™, where images are very often uploaded).

Still referring to FIG. 1, in the original desktop browser-based application, clicking on the button 101 marked "Add images or videos" would result in the user being presented with a modal dialog containing a set of form fields with one of the form fields being a file upload form field.

In this example implementation, instead of having the link direct the user to the modal dialog, the mobilized web application interacts with a mobile device camera application. By leveraging the camera directly, the user can skip the monotonous task of having to first get the image or video file via a separate application, store the file and then in turn upload the file to the website server. That is, by providing this simplified user experience, the user can now have the camera support enabled as part of the mobilized web application.

FIG. 2 shows details of an example workflow for carrying out this implementation. As seen, at step 201 a resource (e.g., a webpage) is loaded into a WYSIWYG ("what you see is what you get") editor. At step 203 a selection is made (e.g., by a computer tool comprising hardware and/or software) of a webpage form (see, e.g., form 100 of FIG. 1) for uploading images/videos. In one specific example, the selection may be made manually by a user. At step 205 the computer tool determines that existing file upload program code (e.g., a widget) is associated with the selected webpage form. In one specific example, the determination may be made manually by a user. In another specific example, the existing file upload program code may be associated with a webpage designed and/or configured for use with a conventional desktop (non-mobile) browser. At step 207, the computer tool replaces the existing file upload program code of the selected webpage form with program code (e.g., a widget) for a camera that is part of a mobile device.

In one example, selection step 203 and/or determination step 205 may be made automatically by the computer tool. In one specific example, such automation may utilize context awareness. For example, if text is found that suggests to upload an image and such text can be associated with something like a feedback/ratings type of widget, it can be assumed this could be converted to a widget that invokes the native camera API.

Figure 3:
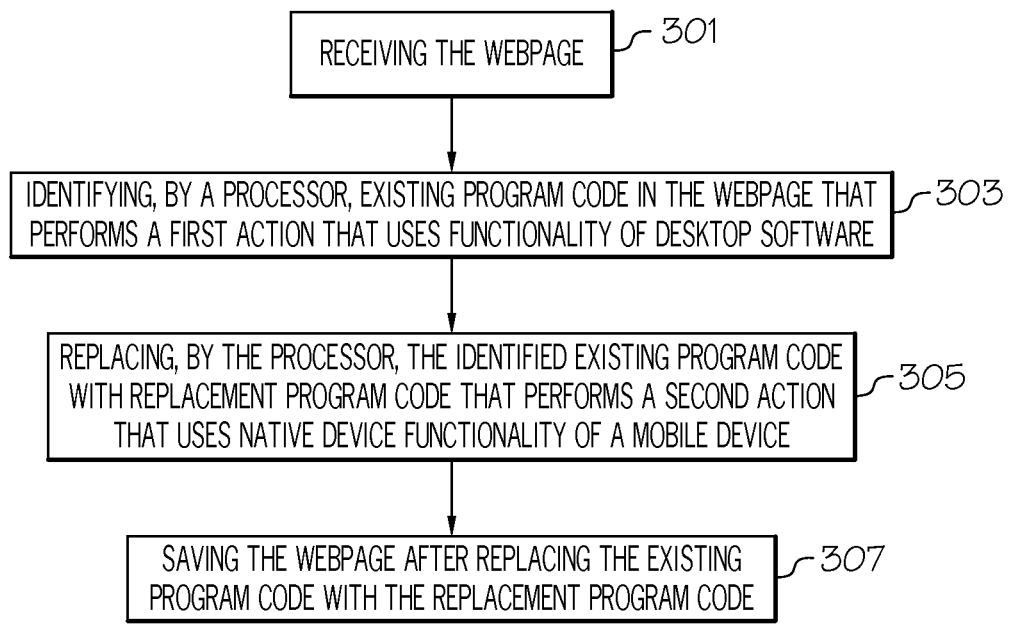
FIG. 3 depicts a flowchart of a method according to an embodiment of the present invention.

Referring now to FIG. 3, a method implemented in a computer system for modifying at least one webpage is shown. As seen in this FIG. 3, the method of this embodiment comprises: at 301—receiving the webpage; at 303—identifying, by a processor, existing program code in the webpage that performs a first action that uses functionality of desktop software; at 305—replacing, by the processor, the identified existing program code with replacement program code that performs a second action that uses native device capability of a mobile device; and at 307—saving the webpage after replacing the existing program code with the replacement program code.

In one example, the webpage may be received and/or saved by the processor.

In another example, any steps may be carried out in the order recited or the steps may be carried out in another order.

Figure 4:
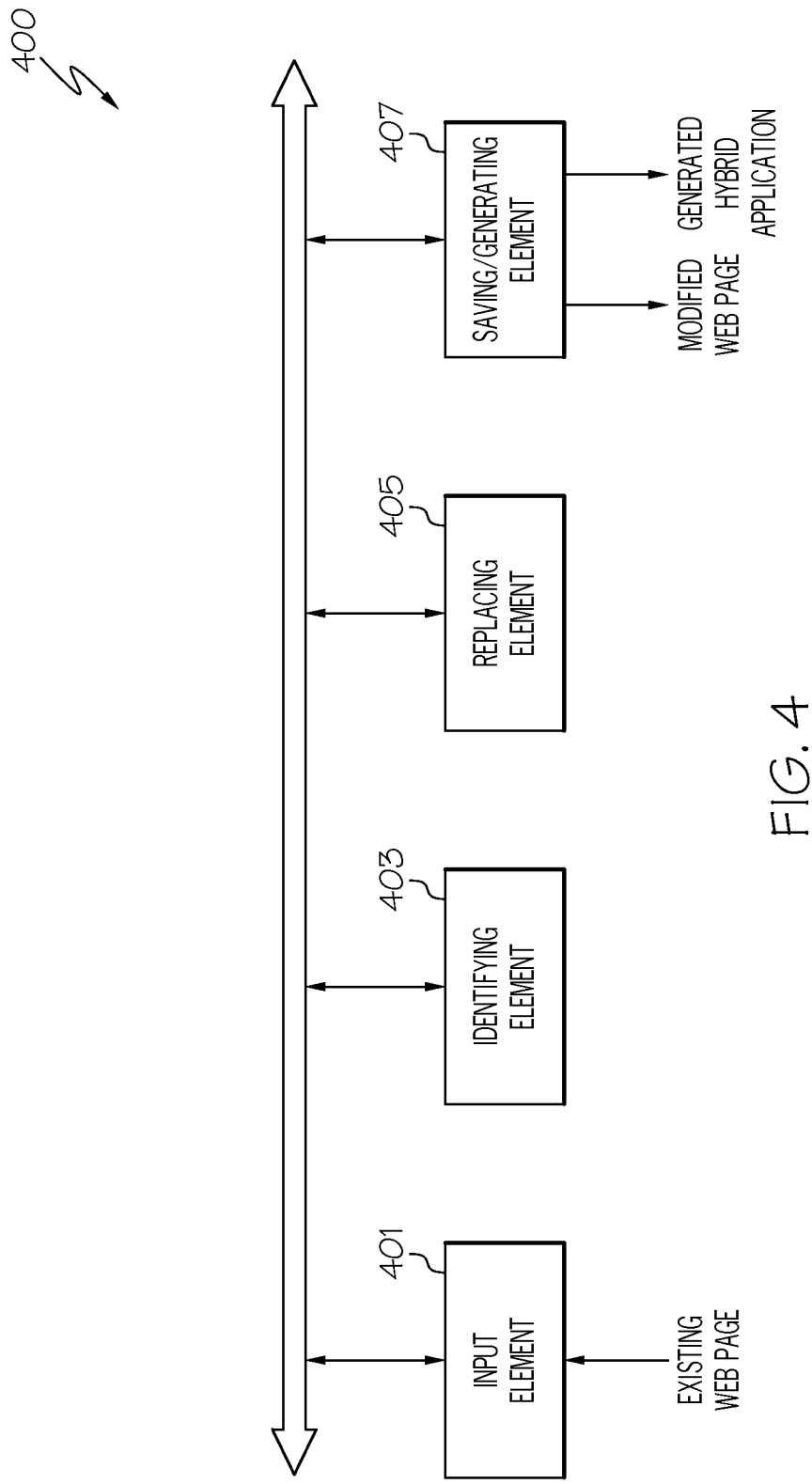
FIG. 4 depicts a block diagram of a system according to an embodiment of the present invention.

Referring now to FIG. 4, in another embodiment, a system 400 for modifying at least one webpage is provided. This system may include the following elements: an input element 401 configured to receive the webpage; an identifying element 403 in operative communication with the input element configured to identify existing program code in the webpage that performs a first action that uses functionality of desktop software; a replacing element 405 in operative communication with the input element and the identifying element configured to replace the identified existing program code with replacement program code that performs a second action that uses native device capability of a mobile device; and a saving/generating element 407 in operative communication with the input element, the identifying element and the replacing element configured to: (a) save the webpage (as a modified webpage) after the existing program code is replaced with the replacement program code (wherein the modified webpage performs the second action that uses native device capability of a mobile device); and/or (b) generate and save a hybrid application after the existing program code is replaced with the replacement program code (wherein the generated hybrid application performs the second action that uses native device capability of a mobile device).

Further, the saved modified webpage and/or the saved generated hybrid application may then be installed on a mobile device using any appropriate mechanism (e.g., downloading via a network).

In one example, communication between and among the various components of FIG. 4 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 5.

In another example, a method for converting an existing web application to a mobile application taking advantage of native device capabilities comprises: converting a web application to a mobile web application by parsing and separating the web application into static content and a dynamic content with data sources; rendering the static content as hypertext markup language (HTML) pages with the links between the HTML pages converted to local links and references to dynamic content changed to Representational State Transfer (REST) requests; utilizing a mobile gateway on a remote server for accessing the dynamic content with the data sources; converting a section of a webpage for the mobile web application into a set of separate webpages (views); packaging the views into the mobile web application; installing the mobile web application on a mobile device; and converting the views to utilize one or more natively installed applications (e.g., via application programming interface(s) or API's).

Figure 5:
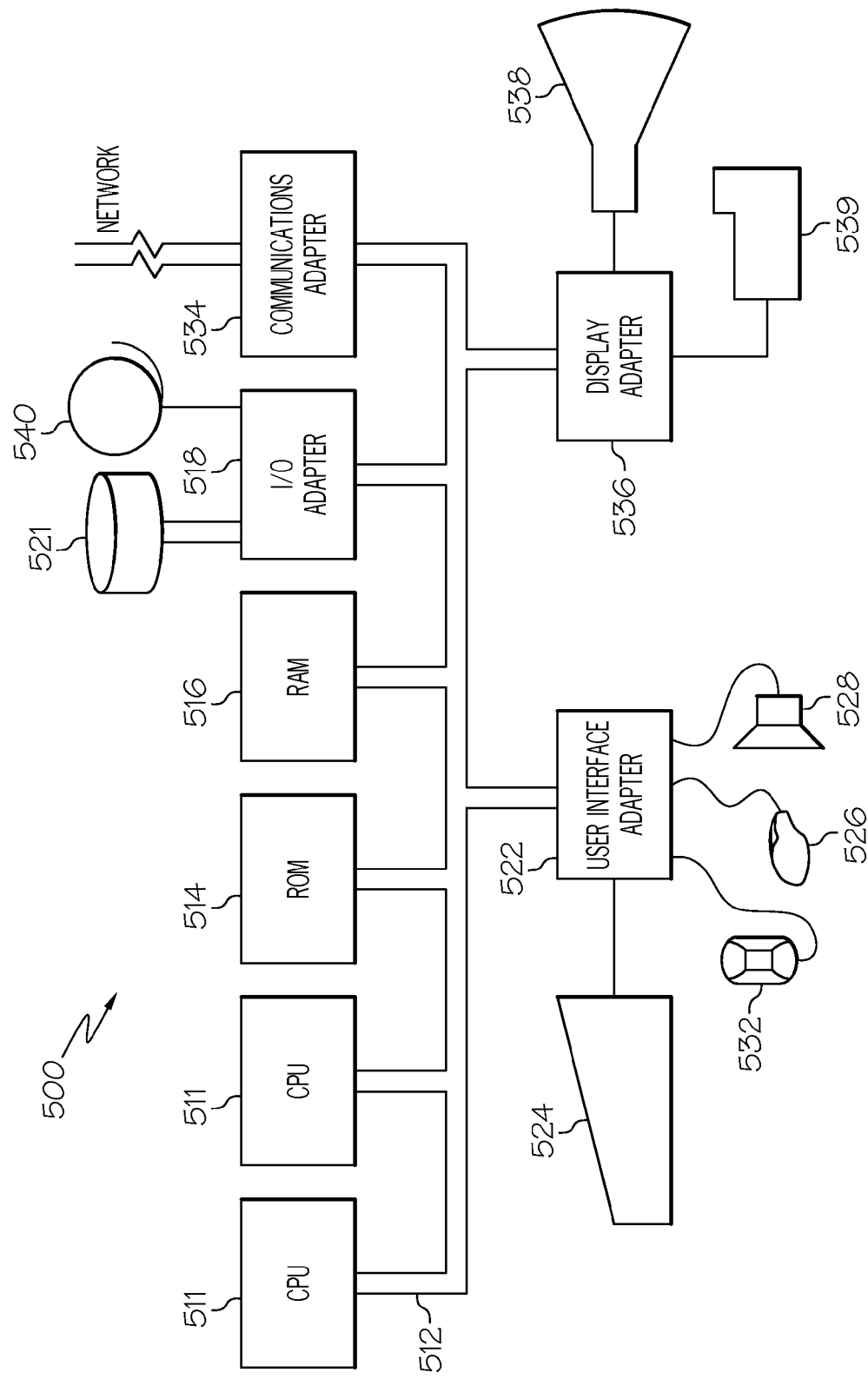
FIG. 5 depicts a block diagram of a system according to an embodiment of the present invention.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

As described herein, a mechanism is provided for converting an existing browser based application into a mobile application. Such conversion may be performed by denoting a section of an existing webpage that can be pulled into a separate webpage (called a "view"). One or more of such views may then be packaged as part of what is referred to as a hybrid application. Further one or more of such views may be configured to utilize certain native device capabilities that do not exist in a browser application (mobile or desktop).

As described herein, a model is provided for generating mobile views from existing desktop-based browser program code. In one example, the model may include determining that certain existing functionality could be replaced by other functionality that is only capable of being performed on mobile devices.

As described herein, various embodiments provide for leveraging device capabilities that are available only to natively installed applications. Such leveraging of device capabilities can be used to enhance the views that are created (which in essence can yield entirely new views that were not possible with the original application).

As described herein, enhanced mobile views may be run as part of a native container, wherein the enhanced mobile views can leverage device APIs that are native to a device and can provide a unique browsing experience. Examples of such device APIs include (but are not limited to): camera, vibration, accelerometer, contact lists, notifications, geolocation, sound playback, device information, click to call.

As described herein, web applications (e.g., existing web applications) may be converted to native applications for mobile devices to leverage various native mobile device capabilities (e.g., camera, vibration, accelerometer, contact lists, notifications, geolocation, sound playback, device information, click to call) that are otherwise not available to a web application.

In various embodiments, a mechanism such as "Phone-Gap" may be used to implement having a mobile webpage being capable of calling device APIs.

As described herein, the APIs capable of being called may include (but not be limited to): Accelerometer, Camera, Capture, Compass, Connection, Contacts, Device, Events, File, Geolocation, Globalization, InAppBrowser, Media, Notification, Splashscreen, and/or Storage.

As described herein, various embodiments may be provided in the context of next generation web application enablement (including WEB 2.0 and/or Rich Internet Application (RIA)).

As described herein, various embodiments may be provided in the context of mobile integration.

As described herein, various embodiments may be provided in the context of: (a) Cloud: Delivery model: Platform as a Service (PaaS); (b) Cloud: Delivery model: Software as a Service (SaaS); and/or (c) Software: Application development software. As described herein, various embodiments may provide for refactoring a user interface (UI) to take advantage of native device APIs.

In another example, the replacement program code may comprise code (e.g., JavaScript) that interacts with an API of the mobile device.

In another example, the replacement program code may comprise code (e.g., JavaScript) that interacts with an API of the mobile device via software.

In another example, a plurality of web applications (e.g. comprising a website) may be mobilized to take advantage of a native device capability.

In another example, a web application may be mobilized to take advantage of a plurality of native device capabilities.

In one embodiment, a method for modifying at least one webpage is provided, the method comprising: receiving the webpage; identifying, by a processor, existing program code in the webpage that performs a first action that uses functionality of desktop software; and replacing, by the processor, the identified existing program code with replacement program code that performs a second action that uses native device capability of a mobile device.

In one example, the webpage comprises HTML.

In another example, the existing program code comprises a widget.

In another example, the replacing comprises removing the existing program code from the webpage and inserting the replacement program code into the webpage.

In another example, the replacing comprises inserting the replacement program code into the webpage and rendering the existing program code inoperative on the mobile device.

In another example, the desktop software comprises web browser software.

In another example, the first action comprises a file upload process.

In another example, the file upload process comprises uploading at least one of: (a) at least one image file; (b) at least one video file; and (c) at least one audio file.

In another example, the mobile device comprises a camera and a microphone and wherein the second action comprises at least one of: (a) obtaining a photo with the camera; (b) obtaining a video with the camera and the microphone; and (c) obtaining audio with the microphone.

In another example, the replacement program code comprises a widget.

In another example, the replacement program code comprises JavaScript.

In another example, the method further comprises saving the webpage after replacing the existing program code with the replacement program code.

In another example, the first action and the second action are related actions such that the performance of the second action eliminates a need to perform the first action.

In another embodiment, a computer readable storage medium, tangibly embodying a program of instructions executable by the computer for modifying at least one webpage is provided, the program of instructions, when executing, performing the following steps: receiving, by the computer, the webpage; identifying, by the computer, existing program code in the webpage that performs a first action that uses functionality of desktop software; and replacing, by the computer, the identified existing program code with replacement program code that performs a second action that uses native device capability of a mobile device.

In one example, the webpage comprises HTML.

In another example, the existing program code comprises a widget.

In another example, the replacing comprises removing the existing program code from the webpage and inserting the replacement program code into the webpage.

In another example, the replacing comprises inserting the replacement program code into the webpage and rendering the existing program code inoperative on the mobile device.

In another example, the desktop software comprises web browser software.

In another example, the first action comprises a file upload process.

In another example, the file upload process comprises uploading at least one of: (a) at least one image file; (b) at least one video file; and (c) at least one audio file.

In another example, the mobile device comprises a camera and a microphone and wherein the second action comprises at least one of: (a) obtaining a photo with the camera; (b) obtaining a video with the camera and the microphone; and (c) obtaining audio with the microphone.

In another example, the replacement program code comprises a widget.

In another example, the replacement program code comprises JavaScript.

In another example, the program of instructions, when executing, further performs the following step: saving the webpage after replacing the existing program code with the replacement program code.

In another example, the first action and the second action are related actions such that the performance of the second action eliminates a need to perform the first action.

In another embodiment, a computer-implemented system for modifying at least one webpage is provided, the system comprising: an input element configured to receive the webpage; an identifying element in operative communication with the input element configured to identify existing program code in the webpage that performs a first action that uses functionality of desktop software; and a replacing element in operative communication with the input element and the identifying element configured to replace the identified existing program code with replacement program code that performs a second action that uses native device capability of a mobile device.

In one example, the webpage comprises HTML.

In another example, the existing program code comprises a widget.

In another example, the replacing comprises removing the existing program code from the webpage and inserting the replacement program code into the webpage.

In another example, the replacing comprises inserting the replacement program code into the webpage and rendering the existing program code inoperative on the mobile device.

In another example, the desktop software comprises web browser software.

In another example, the first action comprises a file upload process.

In another example, the file upload process comprises uploading at least one of: (a) at least one image file; (b) at least one video file; and (c) at least one audio file.

In another example, the mobile device comprises a camera and a microphone and wherein the second action comprises at least one of: (a) obtaining a photo with the camera; (b) obtaining a video with the camera and the microphone; and (c) obtaining audio with the microphone.

In another example, the replacement program code comprises a widget.

In another example, the replacement program code comprises JavaScript.

In another example, the system further comprises a saving element in operative communication with the input element, the identifying element and the replacing element configured to save the webpage after the existing program code is replaced with the replacement program code.

In another example, the first action and the second action are related actions such that the performance of the second action eliminates a need to perform the first action.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for modifying at least one webpage, the method comprising:
    receiving a webpage;
    identifying, by a processor, existing program code in the webpage that performs an image upload process that uses functionality of desktop software, wherein the identification of the existing program code comprises: a determination of an existence of text in the webpage that suggests to upload an image along with a determination of an association of the text with feedback/ratings code; and
    replacing, by the processor, the identified existing program code with replacement program code that performs a photo capture that accesses at least one native operating system application programming interface (API) of a mobile device;
    wherein the mobile device comprises a camera for performing the photo capture; and
    wherein the performance of the photo capture eliminates a need to perform the image upload process.

2. The method of claim 1, wherein the webpage comprises HTML.

3. The method of claim 1, wherein the existing program code comprises a widget.

4. The method of claim 1, wherein the replacing comprises removing the existing program code from the webpage and inserting the replacement program code into the webpage.

5. The method of claim 1, wherein the replacing comprises inserting the replacement program code into the webpage and rendering the existing program code inoperative on the mobile device.

6. The method of claim 1, wherein the desktop software comprises web browser software.

7. The method of claim 1, wherein the replacement program code comprises a widget.

8. The method of claim 1, wherein the replacement program code comprises JavaScript.

9. The method of claim 1, further comprising saving the webpage after replacing the existing program code with the replacement program code.

10. The method of claim 1, wherein the photo capture directly accesses the at least one native operating system API of the mobile device.

11. The method of claim 1, wherein the photo capture indirectly accesses the at least one native operating system API of the mobile device.

* * * * *